US012111999B1

(12) United States Patent
Lee et al.

(10) Patent No.: US 12,111,999 B1
(45) Date of Patent: Oct. 8, 2024

(54) DYNAMIC NOISE MONITORING SETTING FOR WIRELESS CHARGER NOISE

(71) Applicant: STMicroelectronics International N.V., Geneva (CH)

(72) Inventors: Sang Soo Lee, Seoul (KR); MooKyung Kang, Seoul (KR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/242,918

(22) Filed: Sep. 6, 2023

(51) Int. Cl.
*G06F 3/041* (2006.01)
*G06F 3/044* (2006.01)

(52) U.S. Cl.
CPC .... *G06F 3/04182* (2019.05); *G06F 3/041662* (2019.05); *G06F 3/0446* (2019.05); *G06F 2203/04107* (2013.01)

(58) Field of Classification Search
CPC ........... G06F 3/04182; G06F 3/041662; G06F 3/0446; G06F 2203/04107
See application file for complete search history.

(56) References Cited

U.S. PATENT DOCUMENTS

| 9,209,802 | B1 * | 12/2015 | Maharyta | G06F 3/0446 |
| 2011/0009057 | A1 | 1/2011 | Saunamaki | |
| 2014/0022203 | A1 * | 1/2014 | Karpin | G01R 29/26 |
| | | | | 702/65 |
| 2016/0062494 | A1 | 3/2016 | Zuber et al. | |
| 2017/0220189 | A1 * | 8/2017 | Guo | H02J 7/0045 |
| 2019/0174239 | A1 | 6/2019 | Niklaus et al. | |
| 2019/0286277 | A1 * | 9/2019 | Zhang | G06F 3/04182 |
| 2021/0036539 | A1 | 2/2021 | Ha et al. | |

OTHER PUBLICATIONS

Huang, Shih-Lun, et al., "Frequency Hopping and Parallel Driving With Random Delay Especially Suitable for the Charger Noise Problem in Mutual-Capacitive Touch Applications," IEEE Access, vol. 7, Dec. 20, 2018, date of current version Jan. 11, 2019, 14 pages.
Klein, Hans W., "Noise Immunity of Touchscreen Devices," Cypress Semiconductor Corp, Cypress Perform, Noise Immunity of Touchscreen Devices, Feb. 2013, 13 pages.

* cited by examiner

*Primary Examiner* — Sanghyuk Park
(74) *Attorney, Agent, or Firm* — Slater Matsil LLP (57) ABSTRACT

According to an embodiment, a method for a touch scan is proposed. The method includes operating a device in first and second modes corresponding to the device, respectively, being wirelessly and not wirelessly charged. In each mode for each frame, the method includes dividing a frequency range corresponding to a touch-sensing technology into M or N positive integer numbers of equal and sequential frequency intervals, where N is greater than M. In the first mode, the method includes determining a first frequency interval of the M frequency intervals with the least noise and performing the touch scan using a first frequency within the first frequency interval. In the second mode for each frame, the method includes determining a second frequency interval of the N frequency intervals with the least noise and performing the touch scan using a second frequency within the second frequency interval.

20 Claims, 4 Drawing Sheets

DYNAMIC NOISE MONITORING SETTING FOR WIRELESS CHARGER NOISE

TECHNICAL FIELD

The present disclosure generally relates to electronic devices and, in particular embodiments, to reduced noise for wireless charging in an electronic device with a touchscreen display.

BACKGROUND

In a device featuring a touchscreen interface capable of wireless charging, the noise produced by the wireless charging circuit while in operation can lead to disruptions in the functioning of the touchscreen interface circuit, often manifesting as unintended touches.

Ghost touching refers to the phenomenon where a touchscreen, controlled by a touchscreen interface circuit, registers unintended or phantom touches due to the noise generated during wireless charging. This interference from the noise can cause the touchscreen to behave erratically, detecting touches or gestures not made by the user. This can lead to inaccurate input, erratic behavior of the device, and an overall frustrating user experience. Generally, these ghost touches typically occur at lower frequencies, coinciding with the periods of maximum noise generation by the wireless charging circuit.

One approach to mitigating this issue involves employing noise-shaping. Noise shaping is a technique used to alter the noise distribution in a signal, typically by emphasizing or de-emphasizing specific frequency components to make the noise less perceptible or easier to remove through filtering. It is commonly employed in various fields, including signal processing and communication systems, to improve the overall quality of a signal.

Noise shaping involves adjusting the spectral distribution of the noise generated by the wireless charging circuit. The idea is to move the noise energy away from frequencies that are more sensitive or critical for the touchscreen interface circuit's operation. In the case of ghost touching, this might involve shifting the noise energy away from the lower frequencies where the touchscreen interface is most susceptible to interference. Even though the noise is still present, it is less likely to be interpreted as actual touch inputs, thus reducing the occurrence of ghost touches.

It would be advantageous to have an enhanced technique to reduce noise in a touchscreen display of an electronic device during wireless charging while ensuring accurate discrimination between unwanted noise touches and valid touches.

SUMMARY

Technical advantages are generally achieved by embodiments of this disclosure which describe a noise reduction technique for wireless charging in an electronic device with a touchscreen display.

A first aspect relates to a method for a touch scan operation in an electronic device with a touchscreen display. The method includes operating the electronic device in a first operating mode corresponding to the electronic device being wirelessly charged. In the first operating mode for each frame, the method includes dividing a frequency range corresponding to a touch-sensing technology for the touch scan operation into M number of equal and sequential frequency intervals, M being a positive integer; determining a first frequency interval of the M number of equal and sequential frequency intervals with the least noise; and performing the touch scan operation using a first frequency within the first frequency interval. The method further includes operating the electronic device in a second operating mode corresponding to the electronic device no longer being wirelessly charged. In the second operating mode for each, the method includes dividing the frequency range corresponding to the touch-sensing technology for the touch scan operation into N number of equal and sequential frequency intervals, N being a positive integer greater than M; determining a second frequency interval of the N number of equal and sequential frequency intervals with the least noise; and performing the touch scan operation using a second frequency within the second frequency interval.

A second aspect relates to an electronic device. The electronic device includes a power charging circuit, a touch screen, a non-transitory memory storage, and a processor. The power charging circuit is configured to wirelessly receive power from an external device. The touch screen is configured to process and interpret touch inputs and display images and operate based on a touch-sensing technology during a touch scan operation. The non-transitory memory storage includes instructions. The processor is in communication with the non-transitory memory storage.

The instructions, when executed by the processor, cause the processor to operate the electronic device in a first operating mode corresponding to the electronic device being wirelessly charged using the power charging circuit and operate the electronic device in a second operating mode corresponding to the electronic device no longer being wirelessly charged using the power charging circuit.

In the first operating mode for each frame, the instructions, when executed by the processor, cause the processor to divide a frequency range corresponding to the touch-sensing technology into M number of equal and sequential frequency intervals, M being a positive integer; determine a first frequency interval of the M number of equal and sequential frequency intervals with the least noise; and perform the touch scan operation using a first frequency within the first frequency interval.

In the second operating mode for each frame, the instructions, when executed by the processor, cause the processor to divide the frequency range corresponding to the touch-sensing technology into N number of equal and sequential frequency intervals, N being a positive integer greater than M; determine a second frequency interval of the N number of equal and sequential frequency intervals with the least noise; and perform the touch scan operation using a second frequency within the second frequency interval.

A third aspect relates to a non-transitory computer-readable media storing instructions for a touch scan operation in an electronic device with a touchscreen display. The instructions when executed by a processor, cause the processor to operate the electronic device in a first operating mode corresponding to the electronic device being wirelessly charged and operate the electronic device in a second operating mode corresponding to the electronic device no longer being wirelessly charged.

In the first operating mode for each frame, the instructions, when executed by the processor, cause the processor to divide a frequency range corresponding to a touch-sensing technology for the touch scan operation into M number of equal and sequential frequency intervals, M being a positive integer; determine a first frequency interval of the M number of equal and sequential frequency intervals with the least noise; and perform the touch scan operation using a first frequency within the first frequency interval.

In the second operating mode for each frame, the instructions, when executed by the processor, cause the processor to divide the frequency range corresponding to the touch-sensing technology for the touch scan operation into N number of equal and sequential frequency intervals, N being a positive integer greater than M; determine a second frequency interval of the N number of equal and sequential frequency intervals with the least noise; and perform the touch scan operation using a second frequency within the second frequency interval.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of wireless charging, it should also be appreciated that these inventive aspects may also apply to any other type of charging that generates a frequency-based noise that can affect the touch scan operation of an electronic device. Aspects of this disclosure may similarly apply to different touch-sensing technologies, not limited to self-capacitive or mutual capacitive sensing.

Figure 1:
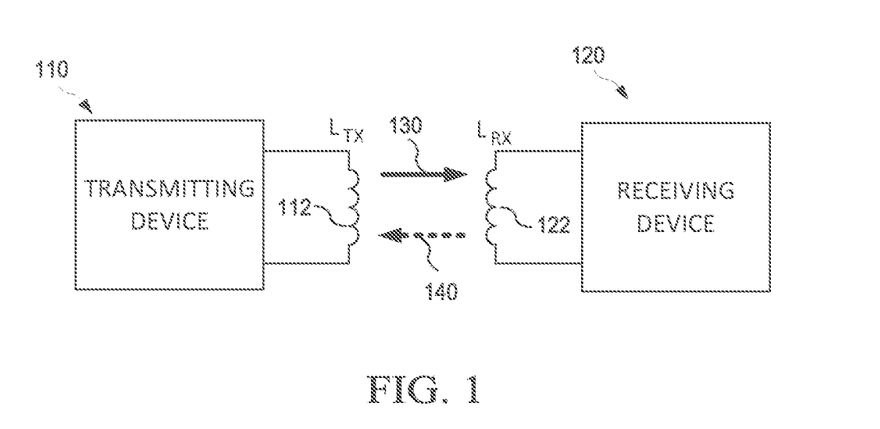
FIG. 1 is a block diagram of an embodiment wireless power system.

FIG. 1 illustrates a block diagram of an embodiment wireless power system 100. The wireless power system 100 may also be called a wireless charging system. The wireless power system 100 includes a transmitting device 110 and a receiving device 120, which may (or may not) be arranged as shown. The transmitting device 110 generates and transmits wireless energy 130 to the receiving device 120.

The transmitting device 110 may be a base station, for example, a charging pad, which provides inductive power to the receiving device 120. The receiving device 120 may be, for example, a mobile device, a tablet, a cellular phone, a wearable communications device (e.g., a smartwatch), a digital pen, a wireless headphone, a toothbrush, a sensor, an internet of things (IoT) device, or the like. The receiving device 120 is the consumer of inductive power.

The transmitting device 110 includes transmitter coils 112 ($L_{TX}$). The receiving device 120 includes receiver coils 122 ($L_{RX}$). Each coil, or winding, may be a loop or magnetic antenna. The coils may have a physical core (e.g., ferrite core) or an air core. The coils may be implemented as an antenna strip or using a Litz wire. The resonant frequency of each coil is based on the shape and size of the looping wire or coil. In some embodiments, additional capacitance and inductance may be added to each coil to create a resonant structure at the desired resonant operating frequency.

In embodiments, the wireless energy 130 is transmitted from the transmitting device 110 to the receiving device 120 using resonant inductive coupling between the transmitter coils 112 and the receiver coils 122. The receiving device 120 may use the power to charge rechargeable batteries or power the components within the receiving device 120 directly.

Several interface standards have been developed to standardize wireless power transfer and related functions. One such interface standard is Qi, which the Wireless Power Consortium (WPC) promotes. Qi and similar standardized protocols may be used to define the communication interface for controlling the power transfer in the wireless power system 100. For instance, the receiving device 120 may request, from the transmitting device 110, a change (e.g., an increase, a decrease, a pause, etc.) related to the transferred wireless energy 130.

In embodiments, transmitting device 110 can initiate a wireless connection at a specific frequency, it can switch frequencies to locate a more suitable frequency match. This adjustment may be necessary due to the changing mutual inductance between the transmitter coils 112 and receiver coils 122, which can be influenced by the separation distance between them, causing fluctuations in the inherent resonance frequency. The wireless power system 100 can include multiple coil setups, encompassing oval coils and multi-coil systems alongside intricate resonance networks featuring multiple inductors and capacitors. These configurations enable adaptable operation across frequencies spanning from, for example, 105 to 205 kHz, potentially reaching maximum voltages of up to 200 volts within the resonant circuit.

Figure 2:
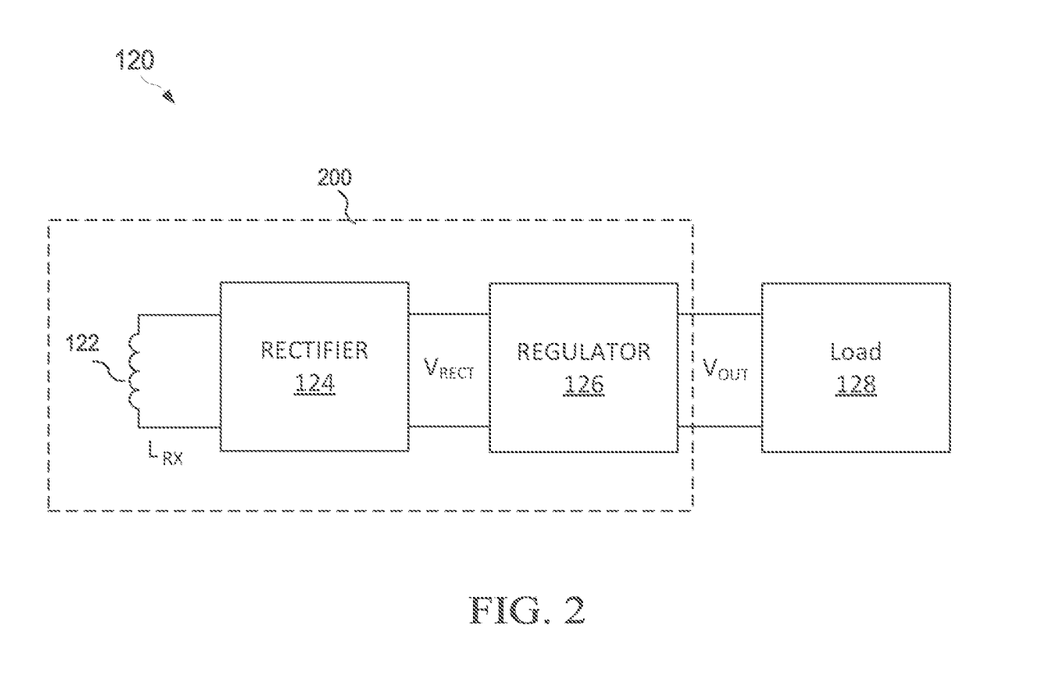
FIG. 2 is a block diagram of an embodiment power charging circuit of the receiving device.

FIG. 2 illustrates a block diagram of an embodiment power charging circuit 200 of the receiving device 120. The receiving device 120 includes the power charging circuit 200 and a load 128. The power charging circuit 200 includes the receiver coils 122, a rectifier 124, and a regulator 126. The power charging circuit 200 may include additional components not depicted in FIG. 2, such as long-term storage (e.g., non-volatile memory, etc.), a non-transitory computer-readable medium, one or more antenna elements, drivers, demodulators, modulators, filter circuits, capacitors, and impedance matching circuits.

The rectifier 124 converts the alternating current (AC) voltage at the receiver coils 122 to a direct current (DC) voltage. The rectifier 124 may be any type of rectifier, such as a low-impedance synchronous rectifier having full-wave or half-wave rectification or an active rectifier. In embodiments, the rectifier 124 may be a bridge rectifier; however, other types of rectifiers are also contemplated.

The regulator 126 receives a voltage ($V_{RECT}$) from the rectifier 124 and then regulates that voltage to maintain a constant output voltage ($V_{OUT}$) at load 128. The regulator 126 may be any voltage regulator, such as a linear regulator (e.g., low drop-out (LDO) linear regulator). In some embodiments, the rectifier 124 and the regulator 126 may be part of a switched-mode power supply (SMPS) circuit.

As shown, load 128 is the primary benefactor of the transferred wireless energy 130. The load 128 may be a charge storage device, such as a battery. For instance, load 128 may be a cellular phone battery or a smartwatch. For example, the transmitting device 110 may be a charging pad and a smartwatch may be placed on the charging pad—the charging pad transfers wireless power to the smartwatch's battery without connecting cables between the two devices.

Figure 3:
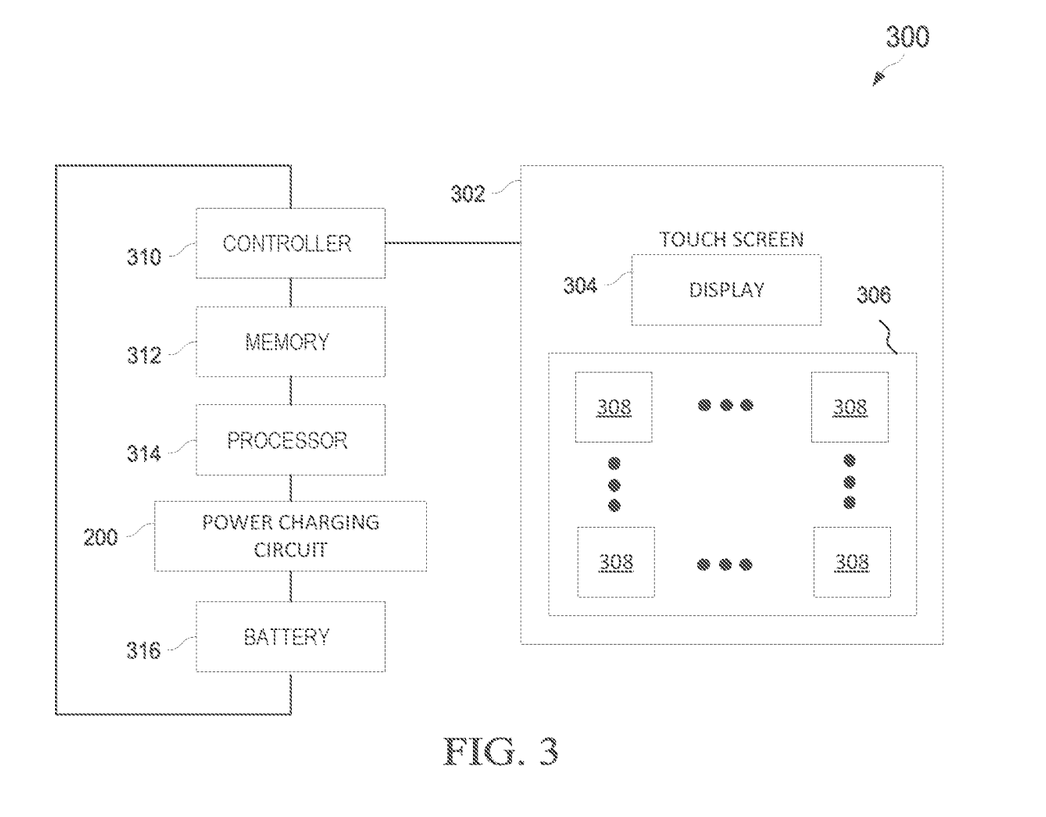
FIG. 3 is a block diagram of an embodiment electronic device.

FIG. 3 illustrates a block diagram of an embodiment electronic device 300, which may be implemented as the receiving device 120. The electronic device 300 includes the power charging circuit 200, a touchscreen interface circuit 302, a touchscreen interface controller 310, a memory 312, a processor 314, and a battery 316, which may (or may not) be arranged as shown. In embodiments, the touchscreen interface controller 310 and the processor 314 may be implemented as a single processing unit. The electronic device 300 may include additional components not depicted, such as long-term storage (e.g., non-volatile memory, etc.), additional input and output interfaces, speakers, or the like.

In embodiments, electronic device 300 is a smartphone, smartwatch, wearable device, tablet, laptop, or any other device that includes a grid-type sensor, such as a device with a touchscreen (e.g., a smart thermostat, a refrigerator, a car infotainment console, or the like).

During normal operation, the touchscreen interface controller 310 controls the operation of the touchscreen interface circuit 302. For example, in some embodiments, the touchscreen interface controller 310 receives raw input data from the touchscreen interface circuit 302 to determine, for example, the location and the type of touch. Touchscreen interface controller 310 may include an analog-to-digital converter (ADC)—not shown—to convert the analog signals from the touchscreen interface circuit 302 to digital signals for further processing by the touchscreen interface controller 310. In embodiments, the ADC may be external to the touchscreen interface controller 310. Touchscreen interface controller 310 may be any component or collection of components adapted to perform computations or other processing-related tasks. The touchscreen interface controller 310 is arranged on a System-on-Chip (SoC) in embodiments. In embodiments, the touchscreen interface controller 310 may be implemented in any way known in the art.

Memory 312 may be any component or collection of components adapted to store programming or instructions for execution by the touchscreen interface controller 310. In an embodiment, memory 312 includes a non-transitory computer-readable medium. In some embodiments, memory 312 is part of processor 314. In some embodiments, memory 312 is external to the processor 314 (such as inside touchscreen interface controller 310). Other implementations are also possible. In some embodiments, memory 312 may also be used for storing other types of data of electronic device 300.

In embodiments, the touchscreen interface circuit 302 allows users to interact/communicate with the electronic device 300. In embodiments, touchscreen interface circuit 302 includes a display 304 and an array of sensors 306 (also called a grid, a touch grid, touch cells, or sensing elements). Display 304 is configured to display images. In embodiments, a panel driver (not shown) may be coupled to the display 304 and the processor 314. The panel driver may be used to drive the display 304. Display 304 may be implemented in any way known in the art.

The array of sensors 306 includes a plurality of sensors 308 arranged in rows and columns. Sensors 308 and the array of sensors 306 may be implemented in any way known in the art. In embodiments, the touchscreen interface circuit 302 includes a capacitive or a resistive touchscreen. In embodiments, the touchscreen interface circuit 302 uses mutual capacitive, self-capacitive, or any other touch-sensing technology—or any combination thereof.

In embodiments with mutual capacitive sensing, changes in capacitance between multiple electrodes are detected to determine the presence and location of touch input. The frequency of mutual capacitive sensing systems can vary depending on the design and application. The frequency, however, typically falls within the range of radio frequencies (RF), often in the kilohertz (kHz) to megahertz (MHz) range. Frequencies in the low megahertz range (e.g., 1 MHz to 10 MHz) are commonly used for mutual capacitive touchscreens. Higher frequencies can provide better signal-to-noise ratios and enhanced sensitivity, allowing for accurate detection of touch inputs.

In embodiments with self-capacitive sensing, changes in capacitance between a single electrode and the user's touch are measured. The frequency of self-capacitive sensing systems can vary based on design and application. Generally, self-capacitive sensing operates at lower frequencies compared to mutual capacitive sensing. Frequencies in the kilohertz (kHz) range are commonly used for self-capacitive touchscreens. Lower frequencies can provide sufficient sensitivity for detecting touch inputs while minimizing noise interference.

The touchscreen interface circuit 302 and touchscreen interface controller 310 are configured to process and interpret touch inputs from the array of sensor 306 to convert physical touch inputs into digital signals that can be recognized and processed by the processor 314.

In embodiments, processor 314 is implemented as a general-purpose or custom controller or processor coupled to memory 312 and configured to execute instructions from memory 312 or another memory of electronic device 300. In embodiments, processor 314 may be coupled to a second memory of electronic device 300, which stores the instructions to be executed by processor 314. In some embodiments, processor 314 is implemented as part of touchscreen interface controller 310. In embodiments, processor 314 is a master processing unit, and the touchscreen interface controller 310 is a slave processing unit.

Processor 314 is configured to process the analog signals from the touchscreen interface controller 310. It performs amplification, noise filtering, and signal conditioning to ensure accurate and reliable touch detection. In embodiments, processor 314 incorporates advanced algorithms and processing capabilities to enable gesture recognition and recognize various touch gestures, such as swipes, pinches, and rotations, allowing for more sophisticated user interactions with the touch-sensitive surface.

In embodiments, the power charging circuit 200 is configured to provide energy from the transmitting device 110 to the battery 316. In embodiments, the power charging circuit 200 is configured to directly provide energy from the transmitting device 110 to one or more components of the electronic device 300.

As discussed, the wireless power system 100 can operate across a range of frequencies. Wireless power system 100 typically operates with high-frequency switching of switching power converters to convert the power from the transmitting device 110 to the receiving device 120. The switching frequency determines how rapidly the power is switched on and off to regulate the output power, ranging from a few kilohertz (kHz) to several megahertz (MHz), depending on the technology used. The wireless power system 100 switching frequency is typically chosen to balance efficiency, size, and electromagnetic interference (EMI) considerations. Higher switching frequencies allow smaller and more compact charger designs but may require more sophisticated control and filtering techniques to manage the associated EMI.

However, regardless of the operating frequency to charge the receiving device 120, avoiding the noise generated by the wireless power system 100 can be difficult. Generally, the noise generated by the wireless power system 100 can vary depending on several factors, including the specific wireless charging technology and the implementation of the transmitting device 110 and the receiving device 120. For example, the noise generated through the wireless power system 100 can physically couple into the touchscreen interface circuit 302 through the power charging circuit 200.

In addition to the switching frequency, other factors such as the quality of the power charging circuit 200, layout design, filtering techniques, and EMI mitigation strategies employed by the charger manufacturer can influence the noise frequency characteristics of the wireless power system 100. Switching regulators in the transmitting device 110 and the receiving device 120 can generate harmonics (i.e., multiples of the switching frequency) that can extend into higher frequency ranges and potentially cause electromagnetic interference (EMI) issues.

Further, the power charging circuit 200 components, such as the rectifier 124 and the regulator 126, can introduce noise into the wireless power system 100. This noise can manifest as high-frequency switching noise or lower-frequency ripple components.

Embodiments of this disclosure provide an enhanced technique to reduce noise in the touchscreen interface circuit of the electronic device 300 during wireless charging while ensuring accurate discrimination between unwanted noise touches and valid touches. A technique for determining the frequency of the touch-sensing technology during the touch scan step is proposed in embodiments. The frequency is selected from a range of frequencies of the touch sensing technology with the least amount of noise from the wireless power system 100.

In embodiments, two operating modes for the electronic device 300 are introduced: (i) wireless charging mode and (ii) non-wireless charging mode. In embodiments, the noise scan setting for the electronic device 300 is differentiated based on the charging modes.

During each mode, the processor 314, the touchscreen interface controller 310, another processing system, or a combination thereof perform an initial step of real-time noise spectrum analysis on the measured noise across the frequency range of the wireless power system 100 for each frame in accordance with frequency hopping techniques. The real-time noise spectrum analysis provides noise characterization across the frequency range used for mutual capacitive, self-capacitive, or any other touch-sensing technology used by the electronic device 300. These and other details are further detailed below.

Figure 4:
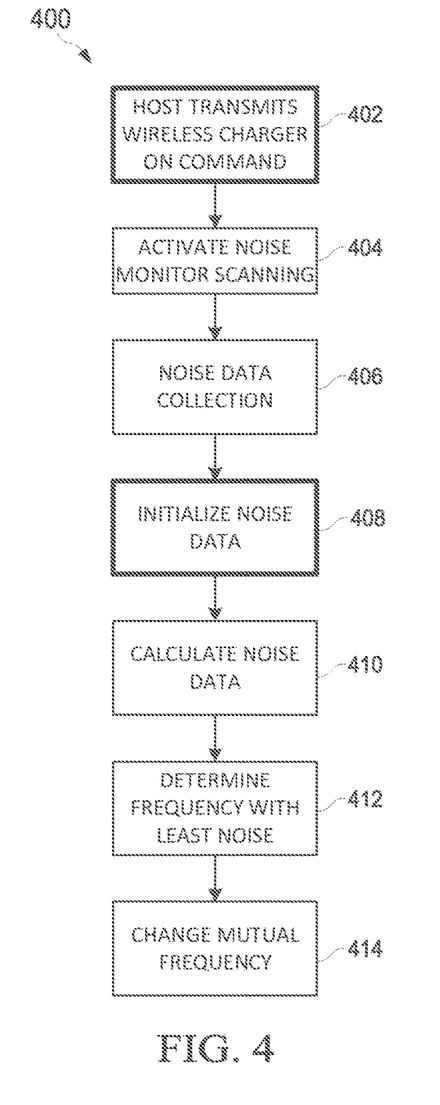
FIG. 4 is a flow chart of an embodiment method for operating the electronic device during the wireless charging mode.

FIG. 4 illustrates a flow chart of an embodiment method 400 for operating the electronic device 300 during the wireless charging mode. In embodiments, a processing component of the electronic device 300 in isolation or with circuitry embedded in, for example, the touchscreen interface circuit 302 or touchscreen interface controller 310, performs a real-time noise spectrum analysis at the beginning of each frame to determine and set the frequency of the touch-sensing technology for the touch scan during the respective frame to minimize noise interferences caused by, for example, the wireless power system 100. The steps corresponding to the frequency determining and setting for the wireless charging mode are outlined below.

At step 402, the processor 314 communicates to the touchscreen interface controller 310 the activation of the wireless charging mode. In embodiments, processor 314 transmits a wireless charger ON signal to, for example, the touchscreen interface controller 310, indicating the activation of the wireless charging mode. In embodiments, the processor 314 communicates the wireless charger ON signal in response to determining the electronic device 300 is being wirelessly charged. In embodiments, the processor 314 communicates the wireless charger ON signal in response to receiving a separate signal indicating that the electronic device 300 is being wirelessly charged.

At step 404, processor 314 communicates to the touchscreen interface controller 310 the activation of the noise monitoring scanning characterization for each frame in response to the activation of the wireless charging mode. As noted above, the noise monitoring scanning characterization parameters for the wireless charging mode differ from the non-wireless charging mode.

In embodiments, the window corresponding to the noise monitor scanning during the wireless charging mode is greater (i.e., longer) than the window corresponding to the noise monitor scanning during the non-wireless charging mode. For example, the window during the wireless charging mode is increased by 25.8% or greater than the window for the non-wireless charging mode. Advantageously, as the window increases, the frequency response improves (i.e., the bandwidth narrows).

In embodiments, the default noise monitoring scanning characterization parameters are set to a first set of parameters corresponding to the non-wireless charging mode. In such embodiments, the noise monitoring scanning characterization parameters are modified in response to the electronic device 300 being in wireless charging mode.

In embodiments, the default noise monitoring scanning characterization parameters are set to a first set of parameters corresponding to the wireless charging mode. In such embodiments, the noise monitoring scanning characterization parameters are modified in response to the electronic device 300 being in non-wireless charging mode.

In embodiments, the noise monitoring scanning characterization parameters are set to a first or a second set of parameters corresponding to the electronic device 300 being in one of the wireless or non-wireless charging modes.

At step 406, the raw noise data for the frequency range corresponding to the touch-sensing technology is measured during the wireless charging mode. In embodiments, the frequency range includes the frequencies corresponding to mutual capacitive sensing, self-capacitive sensing, or any other touch-sensing technology.

In embodiments, the touchscreen interface circuit 302 or a separate noise measurement circuitry divides the frequency range into a smaller set of sequential frequencies with a specific bandwidth (i.e., window) based on the noise monitoring scanning characterization parameters. The touchscreen interface circuit 302 or a separate noise measurement circuitry measures a corresponding noise measurement within each window.

For example, a touch-sensing technology that can operate from 100 KHz to 200 KHz, where the window is set to 20 KHz, the frequency bin is set to 5, resulting in sequential intervals of 100-120 KHz, 120-140 KHz, 140-160 KHz, 160-180 KHz, and 180-200 KHz. The touchscreen interface circuit 302 or a separate noise measurement circuitry measures the noise for each interval during step 406.

In embodiments, the touchscreen interface controller 310 measures the raw noise data using noise measurement circuitry. In embodiments, the noise measurement circuitry is configurable to measure raw noise data for different frequency intervals based on the wireless or non-wireless charging modes.

In embodiments, the raw noise data for frequency ranges corresponding to the self-capacitive sensing technology frequency range are measured. The raw noise data for frequency ranges corresponding to the mutual capacitive sensing technology frequency range are measured in embodiments. In embodiments where the electronic device 300 operates using multiple touch-sensing technologies, separate measurements are made for each corresponding frequency range.

At step 408, the noise data is initialized. During a mutual noise scan routine, a transmit period is sequentially followed by a receive period. In embodiments, during each transmit period of the transmitting device 110 of the mutual noise scan routine, the electronic device 300 samples the noise of the electromagnetic field generated by the transmitting device 110.

During a noise monitor (nmon) scan routine, the transmitting device 110 does not generate an electromagnetic field. In response to not detecting any noise by the electronic device 300, the electronic device 300 does not communicate with the transmitting device 110. In the case where the devices are in an idle condition, the raw data collected during the nmon scan routine equals zero. However, if the electronic device 300 detects a noise during the nmon scan routine and the noise frequency matches the sampling frequency, the electronic device 300 begins communication with the transmitting device 110. In such a case, the absolute value of the raw data collected during the nmon scan routine is greater than the value collected during the no noise case.

In embodiments, as the length of the window corresponding to the noise monitoring scan during the wireless charging mode is increased, the raw noise data collected during the nmon scan routine also changes. Accordingly, the electronic device 300 initializes the raw noise data to account for the change of the window sizing.

At step 410, the raw noise data is analyzed for each interval. In embodiments, the raw noise data for multiple frames are sampled and subsequently processed using signal processing tools. In embodiments, the processing includes, for example, filtering and averaging the noise data for N consecutive frames. In embodiments, N equals 16. It is noted that any type of signal processing may be applied to the raw noise data.

At step 412, once the noise is processed from the raw noise data for each frequency interval, the frequency interval with the least noise is determined. In embodiments, a frequency interval for each touch-sensing technology is determined. For example, a first frequency interval for the operation of self-capacitive sensing and a second frequency interval for the operation of mutual capacitive sensing is determined with the least amount of noise within the corresponding frequency range of the touch sensing technology. In embodiments, for each frame, the frequency interval for each touch-sensing technology is determined at step 412.

At step 414, before performing the touch-sensing scan for the respective frame, the corresponding touch-sensing technology frequency is set to be within the determined interval from step 412. At step 414, the touch-sensing scan is performed by adjusting the frequency of the touch-sensing technology during each touch-sensing scan of the frame, as determined in step 412. In embodiments, the frame rate (i.e., interval) for the frame is 30 Hz, 60 Hz, 90 Hz, or 120 Hz.

Figure 5:
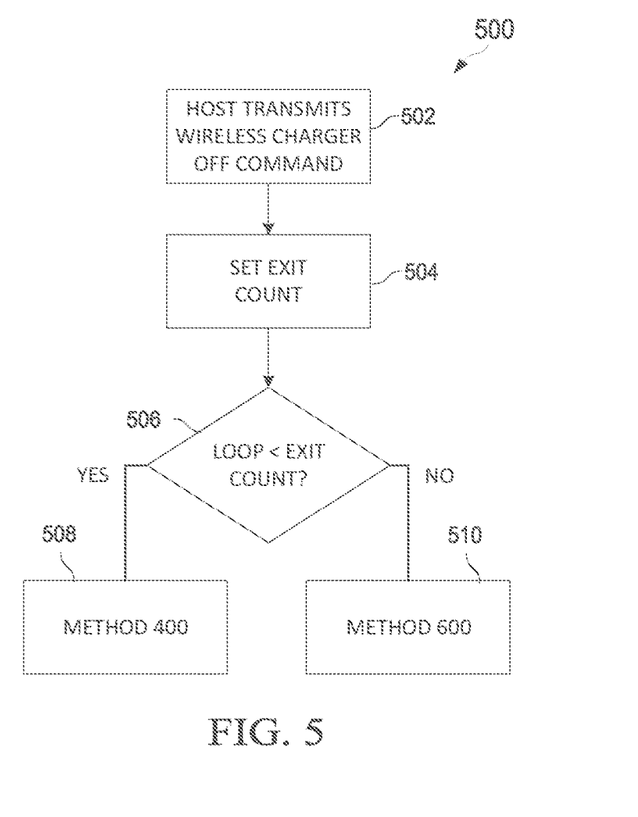
FIG. 5 is a flow chart of an embodiment method for operating the electronic device when exiting the wireless charging mode and entering the non-wireless charging mode.
Figure 6:
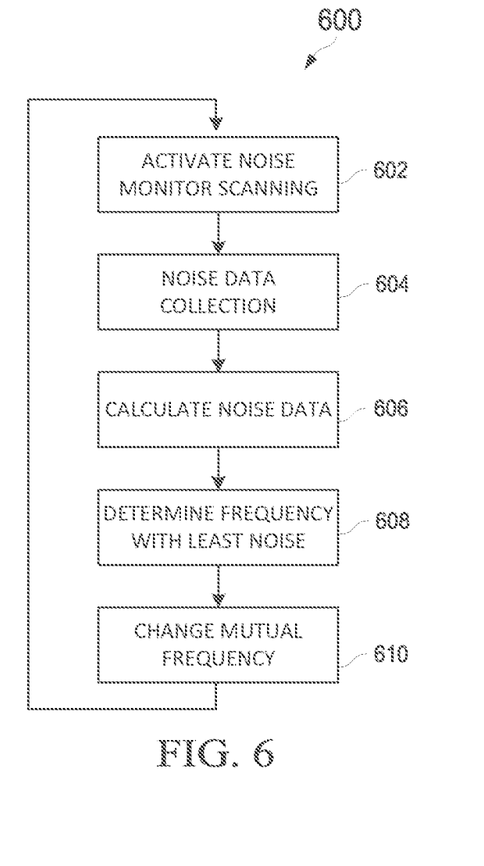
FIG. 6 is a flow chart of an embodiment method for operating the electronic device 300 during the non-wireless charging mode.

FIG. 5 illustrates a flow chart of an embodiment method 500 for operating the electronic device 300 when exiting the wireless charging mode and entering the non-wireless charging mode. When the electronic device 300 is removed from, for example, a charging station, the wireless energy 130 transmitted from the transmitting device 110 is not immediately absent at the electronic device 300. Suppose the electronic device 300 were to immediately transition into method 600, corresponding to the device operating in the non-wireless charging mode. In that case, it is likely that due to the close proximity with the transmitting device 110, noise may still be present, resulting in device malfunction. Method 500 allows the electronic device 300 to transition from the wireless to the non-wireless charging mode and overcome these issues.

At step 502, processor 314 communicates to the touchscreen interface controller 310 the deactivation of the wireless charging mode and activation of the non-wireless charging mode. In embodiments, processor 314 transmits a wireless charger OFF signal to, for example, the touchscreen interface controller 310, indicating the deactivation of the wireless charging mode. In embodiments, the processor 314 communicates the wireless charger OFF signal in response to determining that the electronic device 300 is no longer being wirelessly charged. In embodiments, the processor 314 communicates the wireless charger OFF signal in response to a separate signal indicating that the electronic device 300 is no longer being wirelessly charged.

At step 504, an exit count is set by a counter of, for example, the touchscreen interface controller. A loop count value is initialized, for example, with a value of 'o'. In embodiments, the exit count value is selected to allow the electronic device 300 to transition from the wireless to the non-wireless charging mode. In embodiments, the exit count is selected based on an average time delay associated with a user removing the device from the charging station to a position where the transmitting device 110 no longer provides a wireless energy 130 that can cause noise interference at the electronic device 300.

At step 506, in response to the loop count being less than the exit count value, the electronic device 300, at step 508, continues to operate based on method 400, as described in FIG. 4. Otherwise, the electronic device 300 transitions, at step 510, to the method, as described in FIG. 6, detailed below. The loop count value is incremented until the loop count is equal to the exit count value, in which the electronic device transitions to method 600, in step 510.

It should be noted that the implementation of method 500 can be done in any manner known in the art as long as a set time is allotted for the transition from method 400 to method 500. For example, the loop count value can be set to the exit count value and reduced after each frame until it reaches the value '0', at which point the electronic device transitions from method 400 to method 600.

FIG. 6 illustrates a flow chart of an embodiment method 600 for operating the electronic device 300 during the non-wireless charging mode. In embodiments, a processing component of the electronic device 300 in isolation or with circuitry embedded in, for example, the touchscreen interface circuit 302 or touchscreen interface controller 310, performs a real-time noise spectrum analysis at the beginning of each frame to determine and set the frequency of the touch-sensing technology for the touch scan during the respective frame to minimize noise interferences caused by, for example, the wireless power system 100. The steps corresponding to the frequency determining and setting for the non-wireless charging mode are outlined below.

At step 602, processor 314 communicates to the touchscreen interface controller 310 the activation of the noise monitoring scanning characterization for each frame. As noted above, the noise monitoring scanning characterization parameters for the wireless charging mode differ from the non-wireless charging mode. In embodiments, the noise monitoring scanning characterization parameters are set to a first or a second set of parameters corresponding to the electronic device 300 being in one of the wireless or non-wireless charging modes.

Optionally, the processor 314 communicates to the touchscreen interface controller 310 the activation of the non-wireless charging mode. In embodiments, processor 314 transmits a wireless charger OFF signal to, for example, the touchscreen interface controller 310, indicating the deactivation of the wireless charging mode and activation of the non-wireless charging mode. In embodiments, the processor 314 communicates the wireless charger OFF signal in response to determining that the electronic device 300 is no longer being wirelessly charged. In embodiments, the processor 314 communicates the wireless charger OFF signal in response to receiving a separate signal indicating that the electronic device 300 is no longer being wirelessly charged.

At step 604, the raw noise data for the frequency range corresponding to the touch-sensing technology is measured during the non-wireless charging mode. In embodiments, the frequency range includes the frequencies corresponding to mutual capacitive sensing, self-capacitive sensing, or any other touch-sensing technology.

In embodiments, the touchscreen interface circuit 302 or a separate noise measurement circuitry divides the frequency range into a smaller set of sequential frequencies with a specific bandwidth (i.e., window) based on the noise monitoring scanning characterization parameters. The touchscreen interface circuit 302 or a separate noise measurement circuitry measures a corresponding noise measurement within each window.

For example, a touch-sensing technology that can operate from 100 KHz to 200 KHz, where the window is set to 20 KHz, the frequency bin is set to 10, resulting in sequential intervals of 100-110 KHz, 110-120 KHz, 120-130 KHz, and so forth up to 190-200 KHz. The touchscreen interface circuit 302 or a separate noise measurement circuitry measures the noise for each interval during step 604.

In embodiments, the touchscreen interface controller 310 measures the raw noise data using noise measurement circuitry. In embodiments, the noise measurement circuitry is configurable to measure raw noise data for different frequency intervals based on the wireless or non-wireless charging modes.

In embodiments, the raw noise data for frequency ranges corresponding to the self-capacitive sensing technology frequency range are measured. The raw noise data for frequency ranges corresponding to the mutual capacitive sensing technology frequency range are measured in embodiments. In embodiments where the electronic device 300 operates using multiple touch-sensing technologies, separate measurements are made for each corresponding frequency range.

At step 606, the raw noise data is analyzed for each interval. In embodiments, the raw noise data for multiple frames are sampled and subsequently processed using signal processing tools. In embodiments, the processing includes, for example, filtering and averaging the noise data for N consecutive frames. In embodiments, N equals 16. It is noted that any type of signal processing may be applied to the raw noise data.

At step 608, once the noise is processed from the raw noise data for each frequency interval, the frequency interval with the least noise is determined. In embodiments, a frequency interval for each touch-sensing technology is determined. For example, a first frequency interval for the operation of self-capacitive sensing and a second frequency interval for the operation of mutual capacitive sensing is determined with the least amount of noise within the corresponding frequency range of the touch sensing technology. In embodiments, for each frame, the frequency interval for each touch-sensing technology is determined at step 608.

At step 610, before performing the touch-sensing scan for the respective frame, the corresponding touch-sensing technology frequency is set to be within the determined interval from step 608. At step 610, the touch-sensing scan is performed by adjusting the frequency of the touch-sensing technology during each touch-sensing scan of the frame, as determined in step 608. In embodiments, the frame rate (i.e., interval) for the frame is 30 Hz, 60 Hz, 90 Hz, or 120 Hz.

It is noted that all steps outlined in the flow charts of methods 400, 500, and 600 are not necessarily required and can be optional. Further, changes to the arrangement of the steps, removal of one or more steps and path connections, combination of steps, and addition of steps and path connections are similarly contemplated.

Embodiments of this disclosure provide a technique to reduce noise from a wireless charging system at a touchscreen of an electronic device. The aforementioned technique can be used in isolation or with other techniques to reduce noise. For example, in addition to the above, a proper system design and layout may be implemented, such as isolating sensitive analog components from noisy digital circuitry and employing appropriate shielding techniques to minimize noise interference in the electronic device. In embodiments, the analog front-end circuitry that handles the touch sensor signals includes low-pass filters to eliminate high-frequency noise and amplifiers with good signal-to-noise ratio (SNR) performance. In embodiments, noise shaping filtering in the digital domain is introduced to reduce the impact of noise, such as delta-sigma modulation. This technique oversamples the touch sensor signal and uses a feedback loop to push the quantization noise out of the audible frequency range. Delta-sigma modulators can achieve high-resolution conversions with low noise levels. In embodiments, the electronic circuit employs digital signal processing algorithms to enhance the noise reduction capabilities further. These algorithms can include adaptive filtering, averaging techniques, and advanced noise cancellation algorithms. In embodiments, calibration and fine-tuning of the touchscreen system are performed by adjusting various parameters, such as gain, filtering, and noise shaping parameters, to optimize the touchscreen performance while minimizing noise. In embodiments, proper grounding and power supply design are utilized to minimize ground loops and unwanted noise coupling by, for example, using decoupling capacitors and filtering techniques to ensure a clean power supply. In embodiments, environmental factors are considered that could introduce noise, such as electromagnetic interference (EMI) and mitigated by employing proper shielding and grounding techniques to reduce the impact of external noise sources.

A first aspect relates to a method for a touch scan operation in an electronic device with a touchscreen display. The method includes operating the electronic device in a first operating mode corresponding to the electronic device being wirelessly charged. In the first operating mode for each frame, the method includes dividing a frequency range corresponding to a touch-sensing technology for the touch scan operation into M number of equal and sequential frequency intervals, M being a positive integer; determining a first frequency interval of the M number of equal and sequential frequency intervals with the least noise; and performing the touch scan operation using a first frequency within the first frequency interval. The method further includes operating the electronic device in a second operating mode corresponding to the electronic device no longer being wirelessly charged. In the second operating mode for each, the method includes dividing the frequency range corresponding to the touch-sensing technology for the touch scan operation into N number of equal and sequential frequency intervals, N being a positive integer greater than M; determining a second frequency interval of the N number of equal and sequential frequency intervals with the least noise; and performing the touch scan operation using a second frequency within the second frequency interval.

In a first implementation form of the method according to the first aspect as such, the touch-sensing technology is a first touch-sensing technology. The electronic device further operates based on a second touch-sensing technology. In the first operating mode, the method further includes dividing a second frequency range corresponding to the second touch-sensing technology for the touch scan operation into R number of equal and sequential frequency intervals, R being a positive integer; determining a third frequency interval of the R number of equal and sequential frequency intervals with the least noise; and performing a second touch scan operation using a third frequency within the third frequency interval.

In a second implementation form of the method according to the first aspect as such or any preceding implementation form of the first aspect, in the second operating mode, the method further includes dividing the frequency range corresponding to the second touch-sensing technology for the touch scan operation into T number of equal and sequential frequency intervals, T being a positive integer greater than R; determining a fourth frequency interval of the T number of equal and sequential frequency intervals with the least noise; and performing the second touch scan operation using a fourth frequency within the fourth frequency interval.

In a third implementation form of the method according to the first aspect as such or any preceding implementation form of the first aspect, the first touch-sensing technology is self-capacitive sensing and the second touch-sensing technology is mutual capacitive sensing.

In a fourth implementation form of the method according to the first aspect as such or any preceding implementation form of the first aspect, in the first operating mode, the method comprising generating a wireless charger ON signal indicating that the electronic device is being wirelessly charged and setting N to be greater than M.

In a fifth implementation form of the method according to the first aspect as such or any preceding implementation form of the first aspect, the method further includes initializing a loop counter value in response to determining that the electronic device is no longer being charged, the loop counter value being different from a threshold; operating the electronic device in the first operating mode in response to the loop counter value not being equal to the threshold, wherein the loop counter value is incremented or decremented after each touch scan operation of a corresponding frame; and operating the electronic device in the second operating mode in response to the loop counter value being equal to the threshold.

In a sixth implementation form of the method according to the first aspect as such or any preceding implementation form of the first aspect, the method further includes initializing the loop counter value in response to determining that the electronic device is no longer being charged comprises generating a wireless charger OFF signal indicating that the electronic device is no longer being wireless charged.

A second aspect relates to an electronic device. The electronic device includes a power charging circuit, a touch screen, a non-transitory memory storage, and a processor. The power charging circuit is configured to wirelessly receive power from an external device. The touch screen is configured to process and interpret touch inputs and display images and operate based on a touch-sensing technology during a touch scan operation. The non-transitory memory storage includes instructions. The processor is in communication with the non-transitory memory storage.

The instructions, when executed by the processor, cause the processor to operate the electronic device in a first operating mode corresponding to the electronic device being wirelessly charged using the power charging circuit and operate the electronic device in a second operating mode corresponding to the electronic device no longer being wirelessly charged using the power charging circuit.

In the first operating mode for each frame, the instructions, when executed by the processor, cause the processor to divide a frequency range corresponding to the touch-sensing technology into M number of equal and sequential frequency intervals, M being a positive integer; determine a first frequency interval of the M number of equal and sequential frequency intervals with the least noise; and perform the touch scan operation using a first frequency within the first frequency interval.

In the second operating mode for each frame, the instructions, when executed by the processor, cause the processor to divide the frequency range corresponding to the touch-sensing technology into N number of equal and sequential frequency intervals, N being a positive integer greater than M; determine a second frequency interval of the N number of equal and sequential frequency intervals with the least noise; and perform the touch scan operation using a second frequency within the second frequency interval.

In a first implementation form of the electronic device according to the second aspect as such, the touch-sensing technology is a first touch-sensing technology. The electronic device further operates based on a second touch-sensing technology. The instructions, when executed by the processor in the first operating mode, cause the processor to divide a second frequency range corresponding to the second touch-sensing technology for the touch scan operation into R number of equal and sequential frequency intervals, R being a positive integer; determine a third frequency interval of the R number of equal and sequential frequency intervals with the least noise; and perform a second touch scan operation using a third frequency within the third frequency interval.

In a second implementation form of the electronic device according to the second aspect as such or any preceding implementation form of the second aspect, the instructions, when executed by the processor in the second operating mode, cause the processor to divide the frequency range corresponding to the second touch-sensing technology for the touch scan operation into T number of equal and sequential frequency intervals, T being a positive integer greater than R; determine a fourth frequency interval of the T number of equal and sequential frequency intervals with the least noise; and perform the second touch scan operation using a fourth frequency within the fourth frequency interval.

In a third implementation form of the electronic device according to the second aspect as such or any preceding implementation form of the second aspect, the first touch-sensing technology is self-capacitive sensing and the second touch-sensing technology is mutual capacitive sensing.

In a fourth implementation form of the electronic device according to the second aspect as such or any preceding implementation form of the second aspect, wherein the instructions, when executed by the processor in the first operating mode, cause the processor to generate a wireless charger ON signal indicating that the electronic device is being wirelessly charged and setting N to be greater than M.

In a fifth implementation form of the electronic device according to the second aspect as such or any preceding implementation form of the second aspect, wherein the instructions, when executed by the processor, cause the processor to initialize a loop counter value in response to determining that the electronic device is no longer being charged, the loop counter value being different from a threshold; operate the electronic device in the first operating mode in response to the loop counter value not being equal to the threshold, wherein the loop counter value is incremented or decremented after each touch scan operation of a corresponding frame; and operate the electronic device in the second operating mode in response to the loop counter value being equal to the threshold.

In a sixth implementation form of the electronic device according to the second aspect as such or any preceding implementation form of the second aspect, initializing the loop counter value in response to determining that the electronic device is no longer being charged comprises generating a wireless charger OFF signal indicating that the electronic device is no longer being wireless charged.

A third aspect relates to a non-transitory computer-readable media storing instructions for a touch scan operation in an electronic device with a touchscreen display. The instructions when executed by a processor, cause the processor to operate the electronic device in a first operating mode corresponding to the electronic device being wirelessly charged and operate the electronic device in a second operating mode corresponding to the electronic device no longer being wirelessly charged.

In the first operating mode for each frame, the instructions, when executed by the processor, cause the processor to divide a frequency range corresponding to a touch-sensing technology for the touch scan operation into M number of equal and sequential frequency intervals, M being a positive integer; determine a first frequency interval of the M number of equal and sequential frequency intervals with the least noise; and perform the touch scan operation using a first frequency within the first frequency interval.

In the second operating mode for each frame, the instructions, when executed by the processor, cause the processor to divide the frequency range corresponding to the touch-sensing technology for the touch scan operation into N number of equal and sequential frequency intervals, N being a positive integer greater than M; determine a second frequency interval of the N number of equal and sequential frequency intervals with the least noise; and perform the touch scan operation using a second frequency within the second frequency interval.

In a first implementation form of the non-transitory computer-readable media according to the third aspect as such, the touch-sensing technology is a first touch-sensing technology, wherein the electronic device further operates based on a second touch-sensing technology, and wherein the instructions, when executed by the processor in the first operating mode, cause the processor to divide a second frequency range corresponding to the second touch-sensing technology for the touch scan operation into R number of equal and sequential frequency intervals, R being a positive integer; determine a third frequency interval of the R number of equal and sequential frequency intervals with the least noise; and perform a second touch scan operation using a third frequency within the third frequency interval.

In a second implementation form of the non-transitory computer-readable media according to the third aspect as such or any preceding implementation form of the third aspect, the instructions, when executed by the processor in the second operating mode, cause the processor to divide the frequency range corresponding to the second touch-sensing technology for the touch scan operation into T number of equal and sequential frequency intervals, T being a positive integer greater than R; determine a fourth frequency interval of the T number of equal and sequential frequency intervals with the least noise; and perform the second touch scan operation using a fourth frequency within the fourth frequency interval.

In a third implementation form of the non-transitory computer-readable media according to the third aspect as such or any preceding implementation form of the third aspect, the first touch-sensing technology is self-capacitive sensing and the second touch-sensing technology is mutual capacitive sensing.

In a fourth implementation form of the non-transitory computer-readable media according to the third aspect as such or any preceding implementation form of the third aspect, the instructions, when executed by the processor in the first operating mode, cause the processor to generate a wireless charger ON signal indicating that the electronic device is being wirelessly charged and setting N to be greater than M.

In a fifth implementation form of the non-transitory computer-readable media according to the third aspect as such or any preceding implementation form of the third aspect, the instructions, when executed by the processor, cause the processor to initialize a loop counter value in response to determining that the electronic device is no longer being charged, the loop counter value being different from a threshold; operate the electronic device in the first operating mode in response to the loop counter value not being equal to the threshold, wherein the loop counter value is incremented or decremented after each touch scan operation of a corresponding frame; and operate the electronic device in the second operating mode in response to the loop counter value being equal to the threshold.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for a touch scan operation in an electronic device with a touchscreen display, the method comprising:
   operating the electronic device in a first operating mode corresponding to the electronic device being wirelessly charged, wherein, in the first operating mode for each frame, the method comprises:
      dividing a frequency range corresponding to a touch-sensing technology for the touch scan operation into M number of equal and sequential frequency intervals, M being a positive integer,
      determining a first frequency interval of the M number of equal and sequential frequency intervals, the first frequency interval being an interval with least noise within the M number of equal and sequential frequency intervals, and
      performing the touch scan operation using a first frequency within the first frequency interval; and
   operating the electronic device in a second operating mode corresponding to the electronic device no longer being wirelessly charged, wherein, in the second operating mode for each frame, the method comprises:
      dividing the frequency range corresponding to the touch-sensing technology for the touch scan operation into N number of equal and sequential frequency intervals, N being a positive integer greater than M,
      determining a second frequency interval of the N number of equal and sequential frequency intervals, the second frequency interval being an interval with least noise within the N number of equal and sequential frequency intervals, and
      performing the touch scan operation using a second frequency within the second frequency interval.

2. The method of claim 1, wherein the touch-sensing technology is a first touch-sensing technology, and wherein the electronic device further operates based on a second touch-sensing technology, wherein, in the first operating mode, the method further comprising:
   dividing a second frequency range corresponding to the second touch-sensing technology for the touch scan operation into R number of equal and sequential frequency intervals, R being a positive integer;
   determining a third frequency interval of the R number of equal and sequential frequency intervals, the third frequency interval being an interval with least noise within the R number of equal and sequential frequency intervals; and
   performing a second touch scan operation using a third frequency within the third frequency interval.

3. The method of claim 2, wherein, in the second operating mode, the method further comprising:
   dividing the frequency range corresponding to the second touch-sensing technology for the touch scan operation into T number of equal and sequential frequency intervals, T being a positive integer greater than R;
   determining a fourth frequency interval of the T number of equal and sequential frequency intervals, the fourth frequency interval being an interval with least noise within the T number of equal and sequential frequency intervals; and
   performing the second touch scan operation using a fourth frequency within the fourth frequency interval.

4. The method of claim 3, wherein the first touch-sensing technology is self-capacitive sensing and the second touch-sensing technology is mutual capacitive sensing.

5. The method of claim 1, wherein, in the first operating mode, the method comprises generating a wireless charger ON signal indicating that the electronic device is being wirelessly charged and setting N to be greater than M.

6. The method of claim 1, further comprising:
   initializing a loop counter value in response to determining that the electronic device is no longer being charged, the loop counter value being different from a threshold;
   operating the electronic device in the first operating mode in response to the loop counter value not being equal to the threshold, wherein the loop counter value is incremented or decremented after each touch scan operation of a corresponding frame; and
   operating the electronic device in the second operating mode in response to the loop counter value being equal to the threshold.

7. The method of claim 6, wherein initializing the loop counter value in response to determining that the electronic device is no longer being charged comprises generating a wireless charger OFF signal indicating that the electronic device is no longer being wireless charged.

8. An electronic device, comprising:
   power charging circuit configured to wirelessly receive power from an external device;
   a touch screen configured to process and interpret touch inputs and display images, the touch screen configured to operate based on a touch-sensing technology during a touch scan operation;
   a non-transitory memory storage comprising instructions; and
   a processor in communication with the non-transitory memory storage, wherein the instructions, when executed by the processor, cause the processor to:
      operate the electronic device in a first operating mode corresponding to the electronic device being wirelessly charged using the power charging circuit, wherein, in the first operating mode for each frame, the instructions, when executed by the processor, cause the processor to:
         divide a frequency range corresponding to the touch-sensing technology into M number of equal and sequential frequency intervals, M being a positive integer,
         determine a first frequency interval of the M number of equal and sequential frequency intervals, the first frequency interval being an interval with least noise within the M number of equal and sequential frequency intervals, and perform the touch scan operation using a first frequency within the first frequency interval; and operate the electronic device in a second operating mode corresponding to the electronic device no longer being wirelessly charged using the power charging circuit, wherein, in the second operating mode for each frame, the instructions, when executed by the processor, cause the processor to:

divide the frequency range corresponding to the touch-sensing technology into N number of equal and sequential frequency intervals, N being a positive integer greater than M, determine a second frequency interval of the N number of equal and sequential frequency intervals, the second frequency interval being an interval with least noise within the N number of equal and sequential frequency intervals, and perform the touch scan operation using a second frequency within the second frequency interval.

9. The electronic device of claim 8, wherein the touch-sensing technology is a first touch-sensing technology, wherein the electronic device further operates based on a second touch-sensing technology, and wherein the instructions, when executed by the processor in the first operating mode, cause the processor to:

divide a second frequency range corresponding to the second touch-sensing technology for the touch scan operation into R number of equal and sequential frequency intervals, R being a positive integer;

determine a third frequency interval of the R number of equal and sequential frequency intervals, the third frequency interval being an interval with least noise within the R number of equal and sequential frequency intervals; and perform a second touch scan operation using a third frequency within the third frequency interval.

10. The electronic device of claim 9, wherein the instructions, when executed by the processor in the second operating mode, cause the processor to:

divide the frequency range corresponding to the second touch-sensing technology for the touch scan operation into T number of equal and sequential frequency intervals, T being a positive integer greater than R;

determine a fourth frequency interval of the T number of equal and sequential frequency intervals, the fourth frequency interval being an interval with least noise within the T number of equal and sequential frequency intervals; and perform the second touch scan operation using a fourth frequency within the fourth frequency interval.

11. The electronic device of claim 10, wherein the first touch-sensing technology is self-capacitive sensing and the second touch-sensing technology is mutual capacitive sensing.

12. The electronic device of claim 8, wherein the instructions, when executed by the processor in the first operating mode, cause the processor to generate a wireless charger ON signal indicating that the electronic device is being wirelessly charged and setting N to be greater than M.

13. The electronic device of claim 8, wherein the instructions, when executed by the processor, cause the processor to:

initialize a loop counter value in response to determining that the electronic device is no longer being charged, the loop counter value being different from a threshold;

operate the electronic device in the first operating mode in response to the loop counter value not being equal to the threshold, wherein the loop counter value is incremented or decremented after each touch scan operation of a corresponding frame; and operate the electronic device in the second operating mode in response to the loop counter value being equal to the threshold.

14. The electronic device of claim 13, wherein initializing the loop counter value in response to determining that the electronic device is no longer being charged comprises generating a wireless charger OFF signal indicating that the electronic device is no longer being wireless charged.

15. A non-transitory computer-readable media storing instructions for a touch scan operation in an electronic device with a touchscreen display, that when executed by a processor, cause the processor to:

operate the electronic device in a first operating mode corresponding to the electronic device being wirelessly charged, wherein, in the first operating mode for each frame, the instructions, when executed by the processor, cause the processor to:

divide a frequency range corresponding to a touch-sensing technology for the touch scan operation into M number of equal and sequential frequency intervals, M being a positive integer, determine a first frequency interval of the M number of equal and sequential frequency intervals, the first frequency interval being an interval with least noise within the M number of equal and sequential frequency intervals, and perform the touch scan operation using a first frequency within the first frequency interval; and operate the electronic device in a second operating mode corresponding to the electronic device no longer being wirelessly charged, wherein, in the second operating mode for each frame, the instructions, when executed by the processor, cause the processor to:

divide the frequency range corresponding to the touch-sensing technology for the touch scan operation into N number of equal and sequential frequency intervals, N being a positive integer greater than M, determine a second frequency interval of the N number of equal and sequential frequency intervals with, the second frequency interval being an interval with least noise within the N number of equal and sequential frequency intervals, and perform the touch scan operation using a second frequency within the second frequency interval.

16. The non-transitory computer-readable media of claim 15, wherein the touch-sensing technology is a first touch-sensing technology, wherein the electronic device further operates based on a second touch-sensing technology, and wherein the instructions, when executed by the processor in the first operating mode, cause the processor to:

divide a second frequency range corresponding to the second touch-sensing technology for the touch scan operation into R number of equal and sequential frequency intervals, R being a positive integer;

determine a third frequency interval of the R number of equal and sequential frequency intervals, the third frequency interval being an interval with least noise within the R number of equal and sequential frequency intervals; and perform a second touch scan operation using a third frequency within the third frequency interval.

17. The non-transitory computer-readable media of claim 16, wherein the instructions, when executed by the processor in the second operating mode, cause the processor to:
- divide the frequency range corresponding to the second touch-sensing technology for the touch scan operation into T number of equal and sequential frequency intervals, T being a positive integer greater than R;
- determine a fourth frequency interval of the T number of equal and sequential frequency intervals, the fourth frequency interval being an interval with least noise within the T number of equal and sequential frequency intervals; and
- perform the second touch scan operation using a fourth frequency within the fourth frequency interval.

18. The non-transitory computer-readable media of claim 17, wherein the first touch-sensing technology is self-capacitive sensing and the second touch-sensing technology is mutual capacitive sensing.

19. The non-transitory computer-readable media of claim 15, wherein the instructions, when executed by the processor in the first operating mode, cause the processor to generate a wireless charger ON signal indicating that the electronic device is being wirelessly charged and setting N to be greater than M.

20. The non-transitory computer-readable media of claim 15, wherein the instructions, when executed by the processor, cause the processor to:
- initialize a loop counter value in response to determining that the electronic device is no longer being charged, the loop counter value being different from a threshold;
- operate the electronic device in the first operating mode in response to the loop counter value not being equal to the threshold, wherein the loop counter value is incremented or decremented after each touch scan operation of a corresponding frame; and
- operate the electronic device in the second operating mode in response to the loop counter value being equal to the threshold.

* * * * *